(12) United States Patent
Cheng et al.

(10) Patent No.: US 9,229,308 B2
(45) Date of Patent: Jan. 5, 2016

(54) PROJECTION APPARATUS AND LIGHT CONDENSING MODULE

(71) Applicants: Hung-You Cheng, Hsinchu (TW); Yu-Hsiu Lin, Hsinchu (TW); Yu-Po Chen, Hsinchu (TW); S-Wei Chen, Hsinchu (TW)

(72) Inventors: Hung-You Cheng, Hsinchu (TW); Yu-Hsiu Lin, Hsinchu (TW); Yu-Po Chen, Hsinchu (TW); S-Wei Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 225 days.

(21) Appl. No.: 13/956,384

(22) Filed: Aug. 1, 2013

(65) Prior Publication Data

US 2014/0160444 A1    Jun. 12, 2014

(30) Foreign Application Priority Data

Dec. 7, 2012    (CN) .......................... 2012 1 0524159

(51) Int. Cl.
*G03B 21/20*    (2006.01)
*G03B 21/28*    (2006.01)
*F21V 7/00*    (2006.01)
*G03B 21/00*    (2006.01)
*H04N 9/31*    (2006.01)

(52) U.S. Cl.
CPC .............. *G03B 21/28* (2013.01); *G03B 21/008* (2013.01); *G03B 21/2066* (2013.01); *H04N 9/3111* (2013.01)

(58) Field of Classification Search
CPC .. G03B 21/008; G03B 21/2066; G03B 21/28; G03B 21/20; H04N 9/3111; H04N 9/3114; H04N 9/3197

USPC ..................... 353/81, 102; 362/277, 268, 308
See application file for complete search history.

(56) References Cited

U.S. PATENT DOCUMENTS

| 5,309,188 | A | 5/1994 | Burstyn |
| 6,953,251 | B2 * | 10/2005 | Seki et al. ....................... 353/85 |
| 7,178,920 | B2 | 2/2007 | Ishikura et al. |
| 7,483,216 | B2 | 1/2009 | Penn |

(Continued)

FOREIGN PATENT DOCUMENTS

| CN | 1719301 | 1/2006 |
| CN | 101697059 | 4/2010 |

(Continued)

OTHER PUBLICATIONS

"Office Action of China Counterpart Application", issued on May 26, 2015, p. 1-p. 9.

*Primary Examiner* — William C Dowling
*Assistant Examiner* — Ryan Howard
(74) *Attorney, Agent, or Firm* — Jianq Chyun IP Office

(57) ABSTRACT

A projection apparatus and a light condensing module are provided. The light condensing module condenses and deflects an incident beam. The light condensing module includes a curving incident surface, a curving outgoing surface and a reflection surface. The curving incident surface receives the incident beam. The curving outgoing surface is disposed on a transmission path of the incident beam from the curving incident surface. The reflection surface is disposed on the transmission path of the incident beam, and located between the curving incident surface and the curving outgoing surface. A ray of the incident beam propagates through the curving incident surface along the optical axis of the curving incident surface, and emits out from the curving outgoing surface along a direction inclined to the optical axis of the curving outgoing surface.

21 Claims, 9 Drawing Sheets

(56) References Cited

U.S. PATENT DOCUMENTS

| | | |
|---|---|---|
| 2002/0030773 A1* | 3/2002 | Endo et al. .................... 349/95 |
| 2003/0218726 A1 | 11/2003 | Huibers |
| 2005/0036118 A1 | 2/2005 | Ishikura et al. |
| 2007/0070307 A1 | 3/2007 | Cheng et al. |
| 2011/0164227 A1* | 7/2011 | Kim et al. .................... 353/98 |
| 2012/0162613 A1* | 6/2012 | Liu et al. .................... 353/31 |
| 2013/0188156 A1* | 7/2013 | Kim et al. .................... 353/81 |

FOREIGN PATENT DOCUMENTS

| | | |
|---|---|---|
| CN | 102540661 | 7/2012 |
| JP | 2001042256 | 2/2001 |

\* cited by examiner

PROJECTION APPARATUS AND LIGHT CONDENSING MODULE

CROSS-REFERENCE TO RELATED APPLICATION

This application claims the priority benefit of China application serial no. 201210524159.4, filed on Dec. 7, 2012. The entirety of the above-mentioned patent application is hereby incorporated by reference herein and made a part of this specification.

BACKGROUND

1. Field of Invention

The invention relates to a display apparatus and an optical device. More particularly, the invention relates to a projection apparatus and a light condensing module.

2. Description of Related Art

In general, when a projection apparatus is projecting an image, a light valve would convert an illumination beam into an image beam and reflect the image beam to a projection lens. After then, the image beam is projected onto a screen by the projection lens to form the image.

To let the illumination beam emitted from a light emitting device be uniformly incident onto the light valve, before the illumination beam entering the light valve, several prisms are disposed in front of the light valve in the conventional manner to average the optical path lengths to the light valve for the illumination beam entering at different positions of the prisms. In addition, a gap is reserved between these prisms so as to generate an effect of total reflection and the image beam from the light valve can propagate along a specific direction and transmit through the prisms and then reach to the projection lens. In this manner, the conventional projection apparatus generally needs a larger volume to dispose the prisms. When the developing trend for the projection apparatus is to have smaller volume and even further to be adapted in a portable or hand-held electronic device, it is one of essential issues to be solved by the manufacturers about how to reduce the volume of the projection apparatus.

U.S. Pat. No. 7,178,920 has disclosed a compact projection apparatus, which includes a light source, a condensing lens, a color wheel, a light integrator rod, a total internal reflection (TIR) device with a lens surface, a light valve, and a projection lens, wherein the total internal reflection device with a lens surface includes a first prism and a second prism. In addition, U.S. Pat. No. 7,483,216 has disclosed an optical module, in which one of the total internal reflection prisms has a curving surface. Further, U.S. Pat. No. 5,309,188 has also disclosed a projection apparatus.

SUMMARY OF THE INVENTION

The invention provides a projection apparatus, of which the structure allows to reduce the total volume of the device.

The invention provides a light condensing module, capable of achieving the effect to compensate the optical path length of the incident beam.

The other objectives and advantages of the invention can be further realized from the disclosed features.

To one or part or full of the above objectives or other objective, an embodiment of the invention provides a projection apparatus, including a light source module, a light valve, a projection lens, a total internal reflection (TIR) prism and a light condensing module. The light source module is configured to provide an illumination beam. The light valve is disposed on a transmission path of the illumination beam to convert the illumination beam into an image beam. The projection lens is disposed on a transmission path of the image beam. The light valve has a predetermined incident direction and a predetermined outgoing direction. When the illumination beam is incident onto the light valve at the predetermined incident direction, the image beam propagates to the projection lens from the light valve at the predetermined outgoing direction. The TIR prism is disposed on the transmission path of the illumination beam between the light source module and the light valve, and located on the transmission path of the image beam between the light valve and the projection lens. A first ray of the illumination beam emitted from the light source module, after going through the TIR prism, is incident onto the light valve at the predetermined incident direction. The light condensing module has an incident surface and a curving outgoing surface. The illumination beam emitted from the light source module sequentially transmits through the incident surface and the curving outgoing surface and then propagates to the TIR prism, and an optical axis of the curving outgoing surface inclines with respect to a direction of the first ray incident onto the TIR prism. The optical axis of the curving outgoing surface inclines with respect to the direction of the first ray incident onto the TIR prism toward a direction leaving away from a normal line of the light valve. A position, where the first ray emits out from the curving outgoing surface, is shifted with respect to the optical axis of the curving outgoing surface toward a direction closing to the optical axis of the light valve. The first ray is incident onto a center of an active surface of the light valve along the predetermined incident direction. The position, where the first ray emits out from the curving outgoing surface, is shifted by a first shifting distance with respect to the optical axis of the curving outgoing surface. The incident surface is a curving incident surface, and a second ray of the illumination beam emitted from the light source module propagates through the curving incident surface along the optical axis of the curving incident surface, and then emits out from the curving outgoing surface along a direction inclining with respect to the optical axis of the curving outgoing surface.

A position, where the second ray emits out from the curving outgoing surface, is shifted by a second shifting distance with respect to the optical axis of the curving outgoing surface. The optical axis of the curving incident surface inclines from a direction of a third ray of the illumination beam emitted from the light source module to enter the curving incident surface. The third ray emits from the light source module along an optical axis of the light source module. A position, where a third ray of the illumination beam enters the curving incident surface, is shifted by a third shifting distance from the optical axis of the curving incident surface. The third ray emits from the light source module along the optical axis of the light source module. The light condensing module further includes a reflection surface, disposed on the transmission path of the illumination beam, and between the incident surface and the curving outgoing surface, so as to reflect the illumination beam from the incident surface to the curving outgoing surface. The light condensing module includes a reflection unit, disposed on the reflection surface.

In an embodiment of the invention, the light condensing module comprises a first lens, disposed on the transmission path of the illumination beam, and located between the reflection surface and the light source module, wherein a surface of the first lens facing the light source module is the incident surface; a reflection unit, having the reflection surface, wherein the reflection unit is a reflection mirror or a reflection prism; and a second lens, disposed on the transmission path of the illumination beam, and located between the reflection surface and the TIR prism, wherein a surface of the second lens facing the TIR prism is the curving outgoing surface.

In an embodiment of the invention, the light condensing module comprises a light transmitting unit, and the light transmitting unit has the incident surface, the refection surface and the curving outgoing surface.

In an embodiment of the invention, the light condensing module comprises a lens, disposed on the transmission path of the illumination beam, and located between the reflection surface and the light source module, wherein a surface of the lens facing the light source module is the incident surface; and a light transmitting unit, disposed on the transmission path of the illumination beam, and located between the lens and the TIR prism, wherein the light transmitting unit has the reflection surface and the curving outgoing surface.

In an embodiment of the invention, the light condensing module comprises a light transmitting unit, disposed on the transmission path of the illumination beam, and located between the light source module and the TIR prism, wherein the light transmitting unit has the incident surface and the reflection surface; and a lens, disposed on the transmission path of the illumination beam, and located between the light transmitting unit and the TIR prism, wherein a surface of the lens facing the TIR prism is the curving outgoing surface.

In an embodiment of the invention, the light valve is a digital micro-mirror device. The digital micro-mirror device comprises a plurality of micro mirrors rotating through an on-state angle to an off-state angle, wherein when any one of the micro mirrors rotates to be at the on-state angle, a normal line of the one of the micro mirrors is at a median-angle line between the predetermined incident direction and the predetermined outgoing direction.

In addition, an embodiment of the invention provides a light condensing module, configured to condense and deflect an incident beam. The light condensing module includes a curving incident surface, a curving outgoing surface and a reflection surface. The curving incident surface receives the incident beam. The curving outgoing surface is disposed on a transmission path of the incident beam from the curving incident surface, wherein the incident beam enters the light condensing module through the curving incident surface and leaves the light condensing module through the curving outgoing surface. The reflection surface is disposed on the transmission path of the incident beam, and located between the curving incident surface and the curving outgoing surface, wherein the reflection surface reflects the incident beam from the curving incident surface to the curving outgoing surface. A ray of the incident beam propagates through the curving incident surface along an optical axis of the curving incident surface and is reflected by the reflection surface, and then emits out from the curving outgoing surface at a direction inclined with respect to an optical axis of the curving outgoing surface.

In an embodiment of the invention, a position of the first ray to emit out from the curving outgoing surface has a first shifting distance relatively from the optical axis of the curving outgoing surface.

In an embodiment of the invention, a position of a second ray of the incident beam to enter the curving incident surface has a second shifting distance relatively from the optical axis of the curving incident surface, wherein the second ray enters the curving incident surface along a central axis of the incident beam.

In an embodiment of the invention, the light condensing module further comprises a reflection surface, wherein the reflection surface is disposed on the transmission path of the incident beam, and located between the curving incident surface and the curving outgoing surface, to reflect the incident beam from the curving incident surface to the curving outgoing surface.

In an embodiment of the invention, the light condensing module further comprises a reflection unit disposed on the reflection surface.

In an embodiment of the invention, the light condensing module comprises a first lens, disposed on the transmission path of the incident beam, and located between the reflection surface and the curving incident surface, wherein a surface of the first lens facing away from the reflection surface is the curving incident surface; a reflection unit, having the reflection surface, wherein the reflection unit is a reflection mirror or a reflection prism; and a second lens, disposed on the transmission path of the incident beam, and located between reflection surface and the curving outgoing surface, wherein a surface of the second lens facing away from the reflection surface is the curving outgoing surface.

In an embodiment of the invention, the light condensing module comprises a light transmitting unit, having the curving incident surface, the reflection surface, and the curving outgoing surface.

In an embodiment of the invention, the light condensing module comprises a lens, disposed on the transmission path of the incident beam, and located between the reflection surface and the curving incident surface, wherein a surface of the lens facing away from reflection surface is the curving incident surface; and a light transmitting unit, disposed on the transmission path of the incident beam, and located between the lens and the curving outgoing surface, wherein the light transmitting unit has the reflection surface and the curving outgoing surface.

In an embodiment of the invention, the light condensing module comprises a light transmitting unit, disposed on the transmission path of the incident beam, and located between the curving incident surface and the curving outgoing surface, wherein the light transmitting unit has the curving incident surface and the reflection surface; and a lens, disposed on the transmission path of the incident beam, and located between the light transmitting unit and the curving outgoing surface, wherein a surface of the lens facing away from the reflection surface is the curving outgoing surface.

In an embodiment of the invention, the light condensing module further comprises a supporting unit supporting the light condensing module.

For the foregoing descriptions, the embodiments of the invention can achieve at least one of advantages and effects as follows. In the embodiments of the projection apparatus of the invention, because the optical axis of the curving outgoing surface is inclined with respect to the direction of the first ray to enter the TIR prism, the illumination beam after entering the TIR prism and propagating to the light valve has the optical path length in better uniformity. Therefore, the embodiments of the invention can have the effect to average the optical path length by a simpler structure. This is an advantage to reduce the total volume of projection apparatus in the embodiments of the invention. Further, in the embodiments of light condensing module of the invention, because the light beam of the incident beam propagates along the optical axis of the curving incident surface and transmits through the curving incident surface and then is reflected by the reflection surface. After then, the light beam emits out from the curving outgoing surface along a direction inclined with respect to the optical axis of the curving outgoing surface. As a result, optical path length differences exist between the light beams, which emit out from the light condensing module at different positions. As a result, these optical path length differences can compensate other optical path length differences caused by other optical devices, and the total optical path length difference can be reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
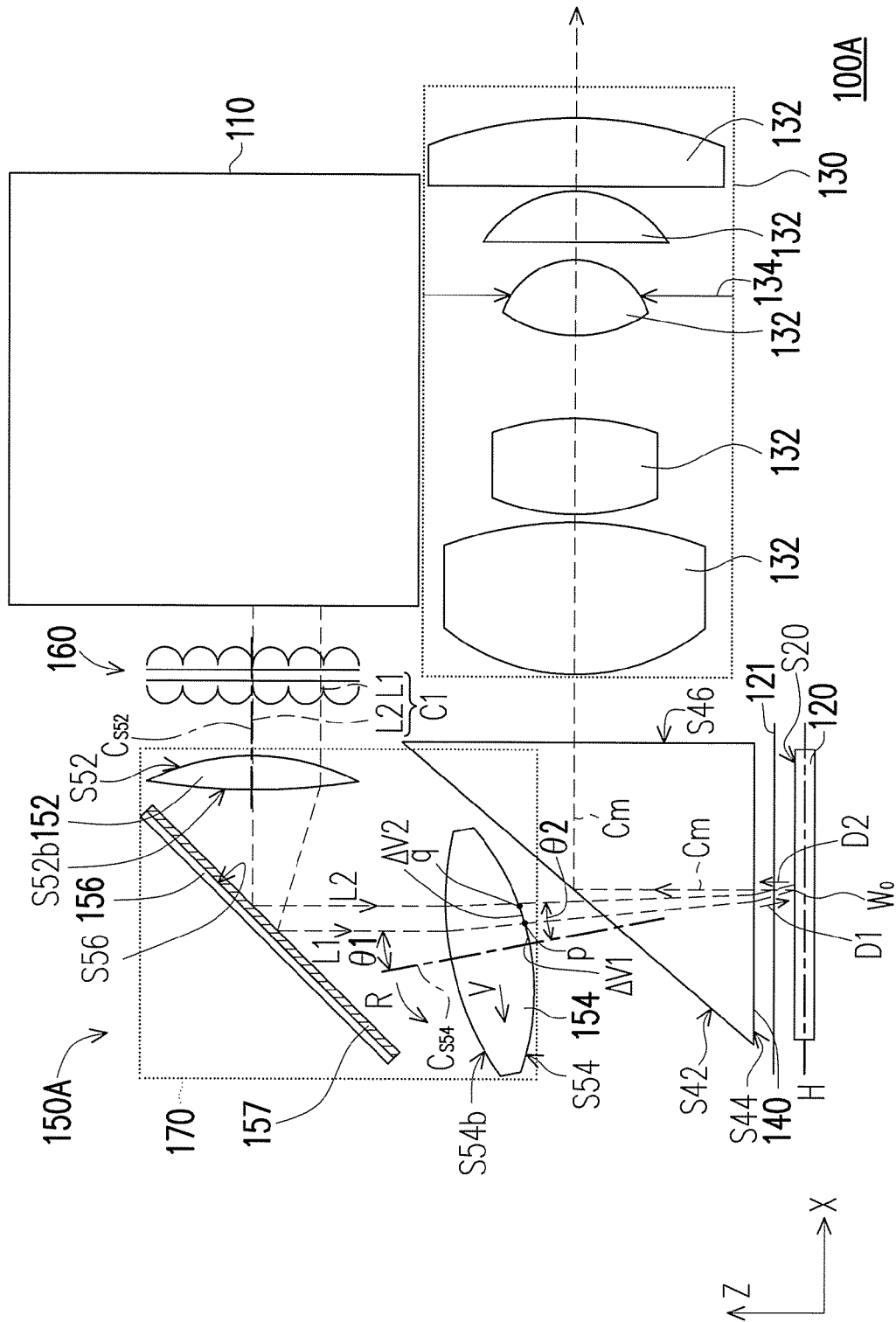
FIG. 1A is a schematic configuration of a projection apparatus according to an embodiment of the invention.

FIG. 1A is a schematic configuration of a projection apparatus according to an embodiment of the invention. A projection apparatus 100A of an embodiment includes a light source module 110, a light valve 120, a projection lens 130, a TIR (Total Internal Reflection) prism 140 and a light condensing module 150A.

Figure 1B:
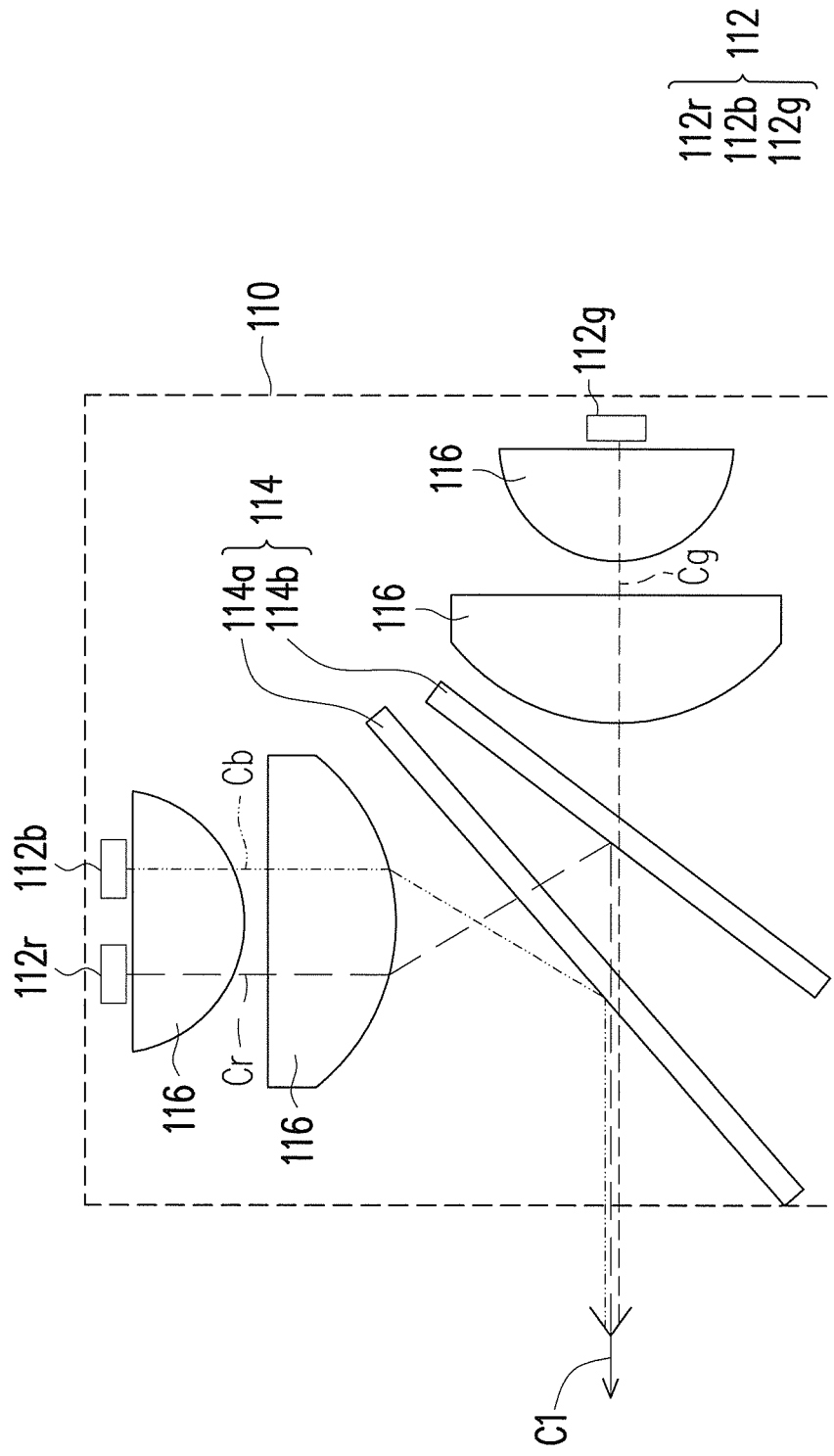
FIG. 1B is a schematic configuration of a light source module, according to an embodiment of the invention.

The light source module 110 is configured to provide an illumination beam C1. FIG. 1B is a schematic configuration of a light source module, according to an embodiment of the invention. Referring to FIG. 1B, the light source module 110 of the embodiment can include a plurality of light emitting devices 112, a light combining device 114 and a plurality of lenses 116, of which four lenses are shown as an example. The light emitting devices 112 are configured to provide multiple color beams, in which the light emitting devices 112 can be light emitting diodes (LEDs), for example. As an example, the light emitting devices 112 can be a red light source 112r, a green light source 112g and a blue light source 112b, to respectively provide a red color beam Cr, a green color beam Cg and a blue color beam Cb, but not limited thereto. The light combining device 114 is disposed on transmission paths of the multiple color beams to combine the color beams, so as to form the illumination beam C1. In detail, the light combining device 114 includes two color splitting units 114a and 114b, in which the color splitting unit 114a is configured to let the red color beam Cr and the green color beam Cg pass through and configured to reflect the blue color beam Cb. The color splitting unit 114b is configured to let the green color beam Cg pass through and configured to reflect the red color beam Cr. In addition, the lenses 116 are respectively disposed between the light combining device 114 and the corresponding light emitting devices 112, to collimate the color beams from the light emitting devices 112, such as red color beam Cr, green color beam Cg and blue color beam Cb, and then the color beams propagate to the light combining device 114.

In the exemplary embodiment, the red light source 112r, the green light source 112g and the blue light source 112b take turns to emit the red color beam Cr, the green color beam Cg and the blue color beam Cb, which enter the light combining device 114 by turns and are combined as the illumination beam C1 after being transmitted to the light combining device 114. In another exemplary embodiment, when the red light source 112r, the green light source 112g and the blue light source 112b are simultaneously activated, the red color beam Cr, the green color beam Cg and the blue color beam Cb are respectively provided and are combined by the light combining device 114 into a white light beam as the illumination beam C1. Further in other exemplary embodiments, the light source module 110 can also take other light combination mechanism. Alternatively, the light source module 110 can include high-pressure-mercury lamp or other suitable light emitting device, to emit the white light beam as the illumination beam C1. Further alternatively, the light source module 110 can also include a laser or a plurality of lasers.

Still referring to FIG. 1A, the light valve 120 is disposed on a transmission path of the illumination beam C1, to convert the illumination beam C1 into an image beam Cm. In detail, the light valve 120 has a predetermined incident direction D1 and a predetermined outgoing direction D2. When the illumination beam C1 propagates along the predetermined incident direction D1 and is incident onto the light valve 120, the image beam Cm would propagates from the light valve 120 to the projection lens 130 along the predetermined outgoing direction D2. The predetermined outgoing direction D2 is, for example, perpendicular to a plane H, on which the light valve 120 is disposed. In the exemplary embodiment, the light valve 120 can be a digital micro-mirror device (DMD). However in other embodiments, the light valve 120 can also be a liquid-crystal-on-silicon (LCOS) panel or other reflective spatial light modulator. Further, a transparent cover glass 121 may be disposed in front of the light valve 120 to protect the light valve 120.

Figure 1C:
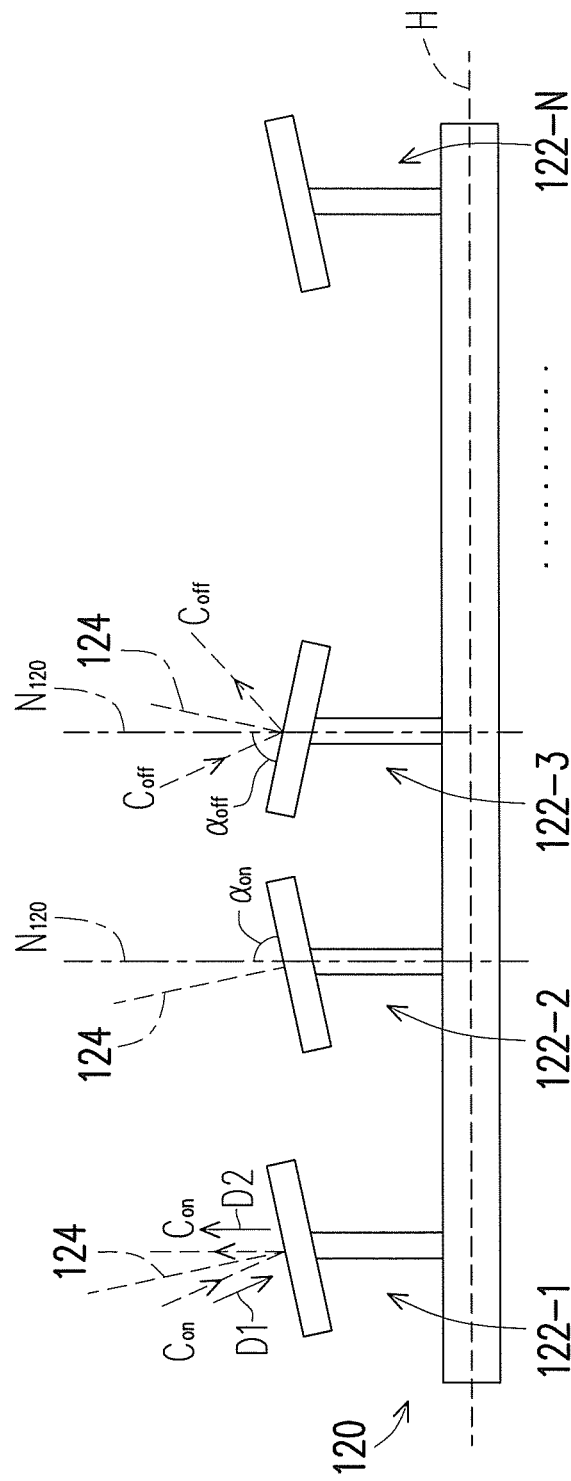
FIG. 1C is a schematic configuration of a light valve, according to an embodiment of the invention.

FIG. 1C is a schematic configuration of a light valve, according to an embodiment of the invention. Referring to FIG. 1C, in the exemplary embodiment, the DMD, that is the light valve 120, has a plurality of micro mirrors 122-1-122-N, and the micro mirrors 122-1-122-N are located at a plane, which is an active surface S20 of the light valve 120 as shown in FIG. 1A, so as to convert the illumination beam C1 incident on the micro mirrors 122-1-122-N into the image beam Cm. Further, the micro mirrors 122-1-122-N can rotate through an on-state angle $\alpha_{on}$ to an off-state angle $\alpha_{off}$. When the micro mirrors 122-1-122-N are at the on-state angle $\alpha_{on}$, there are the predetermined incident direction D1 and the predetermined outgoing direction D2, and a normal line 124 of the micro mirrors 122-1-122-N is a median-angle line between the predetermined incident direction D1 and the predetermined outgoing direction D2.

More specifically, when the micro mirrors 122-1-122-N rotate to the on-state angle $\alpha_{on}$, such as each reflection surface of the micro mirrors 122-1-122-2 having an included angle as the on-state angle $\alpha_{on}$ with a normal line $N_{120}$ perpendicular to the plane H of the light valve 120 in FIG. 1C, the micro mirrors 122-1-122-N can reflects partial rays $C_{on}$ of the illumination beam C1, which are incident on the micro mirrors 122-1-122-N along the predetermined incident direction D1, to the projection lens 130 along the predetermined outgoing direction D2, as shown in FIG. 1A. On the other hand, when the micro mirrors 122-1-122-N rotates to the off-state angle $\alpha_{off}$, such as each reflection surface of the micro mirror 122-3 having an included angle as the off-state angle $\alpha_{off}$ with the normal line $N_{120}$ perpendicular to the plane H of the light valve 120 in FIG. 1C, the micro mirrors 122-1-122-N can reflects partial rays $C_{off}$ of the illumination beam C1, which are incident on the micro mirrors 122-1-122-N along the predetermined incident direction D1, to a position incapable of entering the projection lens 130, such as the position of a heat sink (not shown). Further, the partial rays $C_{on}$ being reflected to the projection lens 130 along the predetermined outgoing direction D2 and a portion of the illumination beam C1 being reflected by the micro mirrors and propagating about along the predetermined outgoing direction D2 form the image beam Cm. As a result, at least one of the micro mirrors 122-1-122-N in the light valve 120 at the on-state angle $\alpha_{on}$ can reflect the illumination beam C1 and convert the illumination beam C1 into the image beam Cm, and the image beam Cm can propagates to the projection lens 130.

In another exemplary embodiment, when the micro mirrors 122-1-122-N are at the on-state angle $\alpha_{on}$, normal lines 124 perpendicular to the reflection surfaces of the micro mirrors 122-1-122-N rotate away from the normal line $N_{120}$ perpendicular to the plane H of the light valve 120 by about +12 degrees, for example. When the micro mirrors 122-1-122-N are at the off-state angle $\alpha_{off}$, the normal lines 124 perpendicular to the reflection surfaces of the micro mirrors 122-1-122-N rotate away from the normal line $N_{120}$ perpendicular to the plane H of the light valve 120 by about −12 degrees, for example. Here, the angles of +12 degrees or −12 degrees for rotating the normal lines 124 of the micro mirrors 122-1-122-N are just an example. In other embodiments, the normal lines 124 of the micro mirrors 122-1-122-N can be rotated by other angles, such as +17 degrees or −17 degrees. In addition, the micro mirrors 122-1-122-2 are at the on-state angle $\alpha_{on}$ and the micro mirror 122-3 is at the off-state angle $\alpha_{off}$ are shown in FIG. 1C as the example. However, the image signals received by the projection apparatus 100 would decide the state angle of each micro mirror, and how long the micro mirrors at the on-state angle $\alpha_{on}$ and the off-state angle $\alpha_{off}$ should last.

Continuing to refer to FIG. 1A, the projection lens 130 is disposed on the transmission path of the image beam Cm. The projection lens 130 can include a plurality of lenses 132 and an aperture stop 134. In the embodiment, the image beam Cm can propagate onto the external screen through the projection lens 130, so an image can be projected on the external screen for viewing by the user. Further, the number of the lenses 132 as shown in FIG. 1A is five as an example. However, the number of lenses 132 is not limited to five in the embodiment.

The TIR prism 140 is disposed on the transmission path of the illumination beam C1 between the light source module 110 and the light valve 120, and on the transmission path of the image beam Cm between the light valve 120 and the projection lens 130. The TIR prism 140 has a surface S42, a surface S44 and a surface 46. In the exemplary embodiment, after a first ray L1 of the illumination beam C1 emitted from the light source module 110 transmits through the TIR prism 140, it would be incident onto the light valve 120 along the predetermined incident direction D1. In detail, the first ray L1 enters the TIR prism 140 through the surface S42, for example. After the first ray L1 transmits through the surface S44, it would propagate to the light valve 120 along the predetermined incident direction D1. Further, the image beam Cm converted by the light valve 120 would enter the TIR prism 140 along the predetermined outgoing direction D2 and further propagates to the projection lens 130. For example, the image beam Cm sequentially transmits through the surface S44 of the TIR prism 140, is totally reflected by the surface S42 and propagates to the projection lens 130 through the surface S46. As a result, the TIR prism 140 can properly adjust the transmission path of the image beam Cm converted by the light valve 120.

The light condensing module 150A has an incident surface S52 and a curving outgoing surface S54 to condense and deflect the illumination beam C1. In detail, the illumination beam C1 from the light source module 110 sequentially transmits through the incident surface S52 and the curving outgoing surface S54 and propagates to the TIR prism 140. An optical axis $C_{S54}$ of the curving outgoing surface S54 is inclined with respect to a direction of the first ray L1 to enter the TIR prism 140. Further to describe, the optical axis $C_{S54}$ of the curving outgoing surface S54 is inclined with respect to the direction of the first ray L1 to enter the TIR prism 140 toward a direction leaving away from the normal line of the plane H of the light valve 120. For example, the optical axis $C_{S54}$ inclines toward the direction R and inclines from the direction of the first ray L1 to enter the TIR prism 140 by an included angle θ1.

Further, the light condensing module 150A in the embodiment can have a reflection surface S56, disposed on the transmission path of the illumination beam C1, and located between the incident surface S52 and the curving outgoing surface S54, to reflect the illumination beam C1 from the incident surface S52 to the curving outgoing surface S54. In detail, the light condensing module 150A in the embodiment can include a first lens 152, a second lens 154 and a reflection unit 156, wherein the first lens 152, the second lens 154 and the reflection unit 156 are disposed on a supporting unit 170, for example. The supporting unit 170 is a holder, for example.

In detail, the first lens 152 is disposed on the transmission path of the illumination beam C1, and located between the reflection surface S56 and the light source module 110, wherein a surface of the first lens 152 facing the light source module 110 is the incident surface S52. The second lens 154 is disposed on the transmission path of the illumination beam C1, and located between the reflection surface S56 and the TIR prism 140, wherein a surface of the second lens 154 facing the TIR prism 140 is the curving outgoing surface S54. The reflection unit 156 is disposed on the transmission path of the illumination beam C1, and located between the first lens 152 and the second lens 154. The reflection unit 156 has the reflection surface S56. In the exemplary embodiment, the reflection unit 156 is a reflection mirror, for example, as shown as the reflection unit 156 shown in FIG. 1A, or a reflection prism, such as the reflection unit 156' shown in FIG. 1D, or other suitable optical device with the reflection function. Further, in the embodiment, another reflection unit 157 can be optionally disposed on the reflection surface S56, wherein the reflection unit 157 is a reflection layer, reflection sheet, or other suitable material with the reflection function, for example.

In the exemplary embodiment, the first ray L1 of the illumination beam C1 is incident onto a center $W_0$ of the active surface S20 of the light valve 120 along the predetermined incident direction D1. The position p, where the first ray L1 emits out from the curving outgoing surface S54, is relatively shifted from the optical axis $C_{S54}$ of the curving outgoing surface S54 by a first shifting distance $\Delta V1$. In other words, the optical axis $C_{S54}$ of the curving outgoing surface S54 is shifted on the x-z plane, which is formed by the direction of the illumination beam C1 to enter the TIR prism 140 and the optical axis $C_{S54}$ of the curving outgoing surface S54. Further to describe, in the embodiment, the position p, where the first ray L1 emits out from the curving outgoing surface S54, is relatively shifted from the optical axis $C_{S54}$ of the curving outgoing surface S54 toward a direction closing to an optical axis of the light valve 120. For example, the first shifting distance $\Delta V1$ is shifted along the direction V.

Further, in the embodiment, the incident surface S52 can be a curving incident surface. However, in other embodiments, the incident surface S52 can be a flat plane. In this embodiment, a second ray L2 of the illumination beam C1 from the light source module 110 also transmits through the curving incident surface, that is the incident surface S52, along the axis $C_{S52}$ of the curving incident surface, and then emits out from the curving outgoing surface S54 along a direction, which is inclined with respect to the optical axis $C_{S54}$ of the curving outgoing surface S54, wherein an included angle θ2 is formed between the optical axis $C_{S54}$ and a direction of the second ray L2 to emit out from the curving outgoing surface S54. Here, the position q, where the second ray L2 emits out from the curving outgoing surface S54, has a second shifting distance $\Delta V2$ with respect to the optical axis $C_{S54}$ of the curving outgoing surface S54.

Figure 1D:
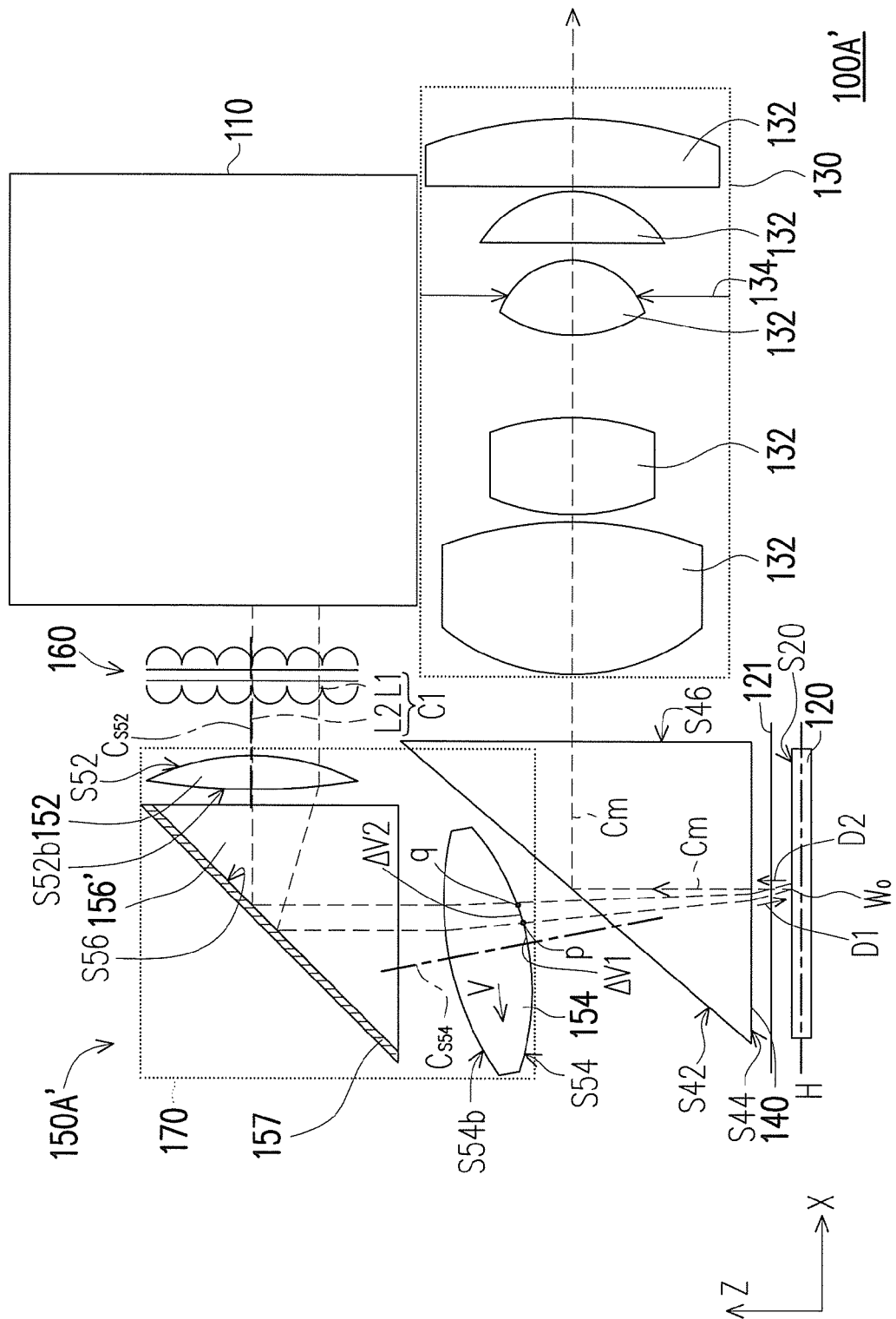
FIG. 1D is a schematic configuration of a projection apparatus, according to another embodiment of the invention.
Figure 1E:
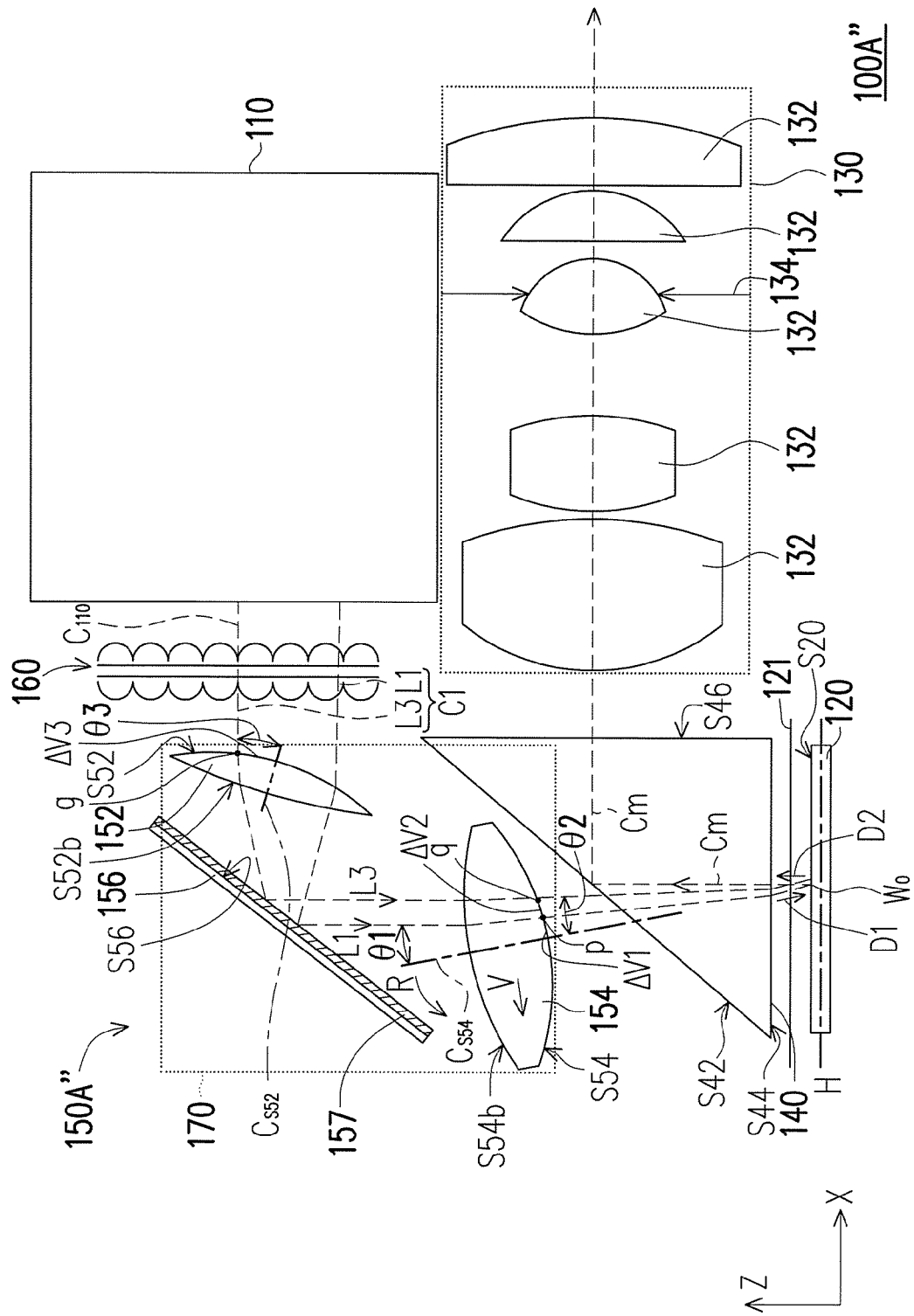
FIG. 1E is a schematic configuration of a projection apparatus, according to another embodiment of the invention.

Further to describe, in the light condensing module 150A" for the other embodiments as shown in FIG. 1E, when the incident surface S52 is a curving incident surface, the optical axis $C_{S52}$ of the curving incident surface is inclined with respect to the direction, along which a third ray L3 of the illumination beam C1 from the light source module 110 is incident onto the curving incident surface. The third ray L3 is emitted out from the light source module 110 along the optical axis $C_{110}$ of the light source module 110. For example, the optical axis $C_{S52}$ of the curving incident surface inclines with respect to the third ray L3 toward a normal direction of the reflection surface S56, that is, the optical axis $C_{S52}$ in the state shown in FIG. 1D is rotated at the clockwise direction on the x-z plane to the position shown in FIG. 1E, wherein the optical axis $C_{S52}$ and the direction of the third ray L3 to enter the curving incident surface form an included angle θ3.

In addition, the position g for the third ray L3 to enter the curving incident surface S52 can further have a third shifting distance $\Delta V3$ from the optical axis $C_{S52}$ of the curving incident surface, that is, the optical axis $C_{S52}$ of the curving incident surface is shifted on the plane x-z formed from the optical axis $C_{110}$ of the light source module 110 and the optical axis $C_{S52}$. For example, the position g which the third ray L3 enters the curving incident surface S52 is shifted toward a direction leaving away from the optical axis $C_{S52}$ of the curving incident surface S52. For easy descriptions, the included angle θ3 and the third shifting distance $\Delta V3$ have been indicated in the light condensing module 150A" as shown in FIG. 1E. However, the light condensing module 150A" of the embodiment can be optionally disposed with one or combination of the included angle θ3 and the third shifting distance $\Delta V3$.

Remarkably, the first lens 152 and the second lens 154 of the embodiment can be optionally disposed with an anti-reflection layer to reduce reflection of the illumination beam C1 and then improve the propagation efficiency of the illumination beam C1. For example, the anti-reflection layer can be disposed on the surface of the first lens 152, that is the incident surface S52, facing the light source module 110 and/or on the surface S52b of the first lens 152 facing the refection surface S56. In addition, the anti-reflection layer can be, for example, disposed on the surface S54b of the second lens 154, facing the reflection surface S56, and/or the surface of the second lens 154, that is the curving outgoing surface S54, facing the TIR prism 140.

Further, in the embodiment, the projection apparatus 100 further includes a light uniforming element 160. The light uniforming element 160 is disposed between the light source module 110 and the light condensing module 150A. In the embodiment, the light uniforming element 160 can be a lens array, for example, to improve the light uniformity of the illumination beam C1 after passing the light uniforming element 160, and can further convert the illumination beam C1 into a shape, conforming with the shape of the light valve 120. However, in other embodiments, the light uniforming element 160 can be a light integration rod.

As to the foregoing descriptions, in the embodiment of the projection apparatus 100, the optical axis $C_{S54}$ of the curving outgoing surface S54 in the light source module 150A is inclined with respect to the direction of the first ray L1 of the illumination beam C1 to enter the TIR prism 140, so the optical path length after the illumination beam C1 enters the TIR prism 140 and propagates to the light valve 120 can be averaged. Therefore, the brightness of the image beam Cm produced by the light valve 120 can be more uniform. As a result, the number of the prisms in the embodiment disposed in front of the light valve 120 can be reduced. In addition, when the illumination beam C1 is incident on the light valve 120 along the predetermined incident direction D1, different portions of the illumination beam C1 can propagate to the light valve 120 with substantially equal optical path lengths. As a result, the shape and size of the light spots of the illumination beam C1 formed on the light valve 120 can be more consistent with shape and size of the light valve 120 and further improve the uniformity of the image beam Cm converted by the light valve 120 and propagating along the predetermined outgoing direction D2 from the light valve 120 to the projection lens 130. Therefore, the embodiments of the invention can use a simpler structure to achieve the effect to average the optical path lengths, and the total volume of the projection apparatus can be reduced.

Further, in the light condensing module 150A of the embodiment, after the illumination beam C1 transmits through the incident surface S52 along the optical axis $C_{S52}$ of the incident surface S52 and is reflected by the reflection surface S56, it emits out form the curving outgoing surface S54 along a direction inclined with respect to the optical axis $C_{S54}$ of the curving outgoing surface S54. As a result, the illumination beam C1 emits out from different positions of the light condensing module 150A can have optical path length differences. Thereby, the light beam emitted form the light condensing module 150A can compensate the optical path length difference caused by the other optical elements, so the total optical path length difference is reduced. As a result, the projection apparatus 100 of the embodiment can have better optical projection quality with high efficiency and can also reduce volume.

Figure 2A:
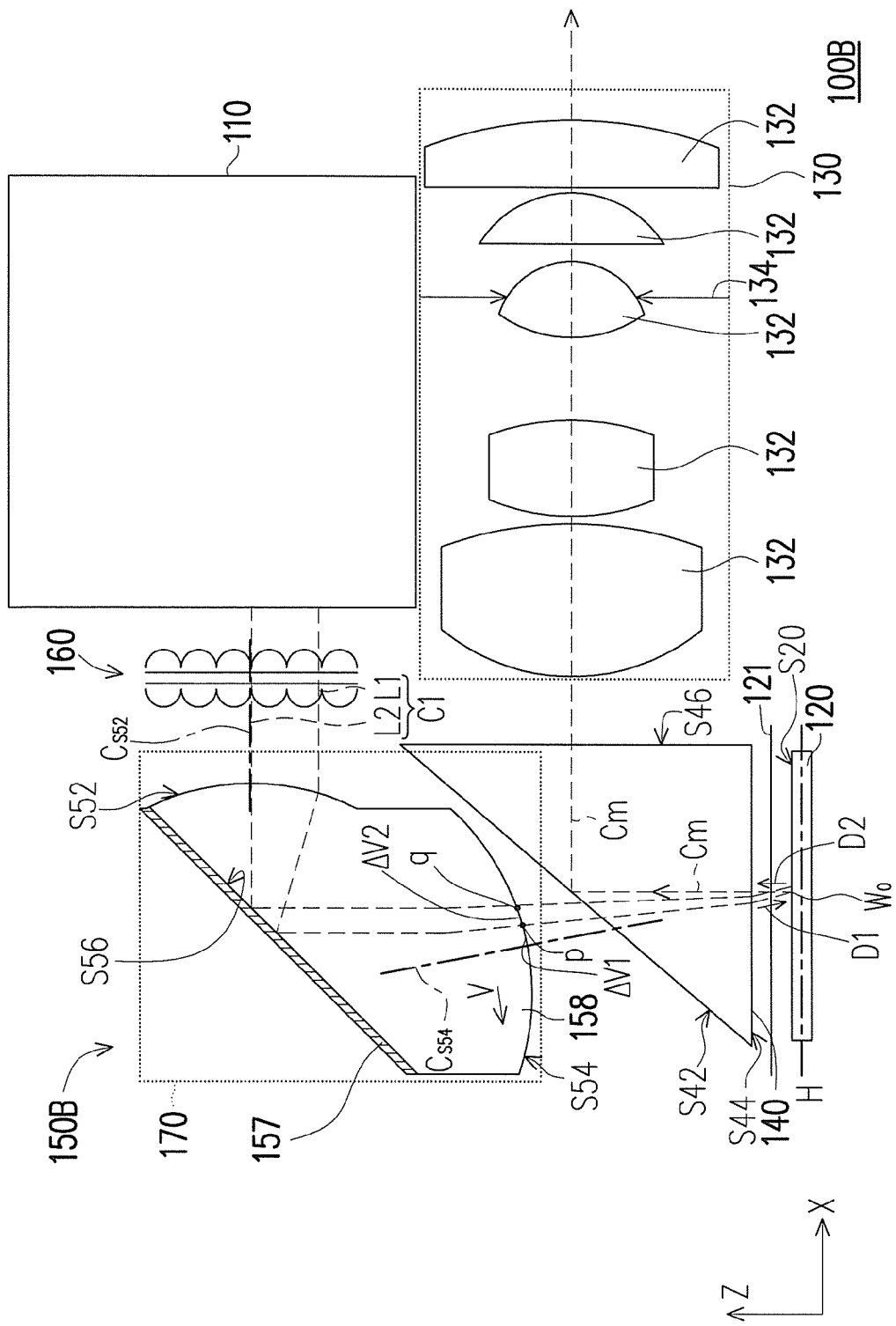
FIG. 2A is a schematic configuration of a projection apparatus, according to another embodiment of the invention.
Figure 2B:
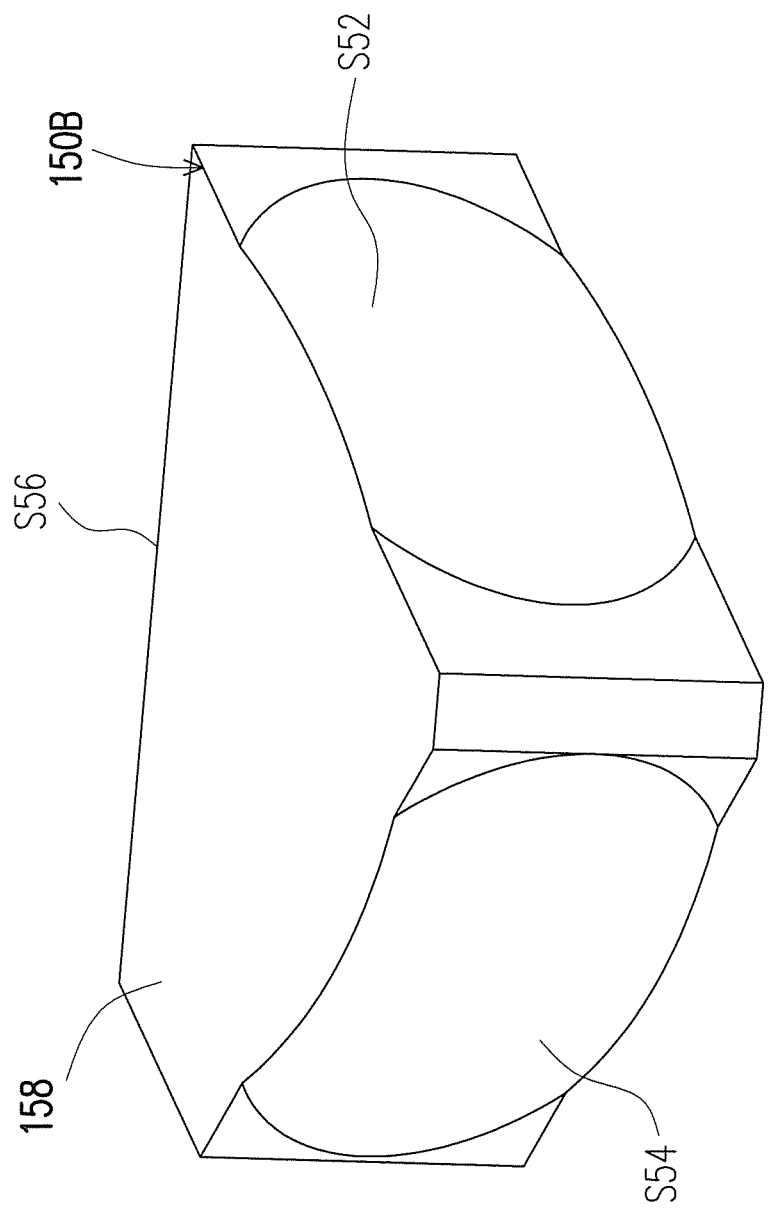
FIG. 2B is an enlarged perspective view, schematically illustrating a part of the light condensing module in the embodiment of the invention.

FIG. 2A is a schematic configuration of a projection apparatus 100B, according to another embodiment of the invention. FIG. 2B is an enlarged perspective view, schematically illustrating a part of the light condensing module 150B in the embodiment of the invention. Referring to FIG. 1A, FIG. 2A, and FIG. 2B, the projection apparatus 100B in this embodiment is similar to the foregoing projection apparatus 100A. However, the difference from the projection apparatus 100A in the embodiment is that the light condensing module 150B of the projection apparatus 100B can include a light transmitting unit 158, having the incident surface S52, the reflection surface S56 and the curving outgoing surface S54. From another point of view, the light condensing module 150B can be considered as that the first lens 152, the second lens 154, and the reflection unit 156 in FIG. 1D are integrated as a single element, for example an integrally formed optical element. In addition, the light transmitting unit 158 in the embodiment can also be disposed with a reflection unit 157 on the reflection surface S56. Further, optionally, anti-reflection layers can also be respectively disposed on the incident surface S52 of the light transmitting unit 158 and the curving outgoing surface S54.

In the embodiment, the optical axis $C_{S54}$ of the curving outgoing surface S54 of the light condensing module 150B can also be inclined with respect to the direction of the first ray L1 of the illumination beam C1 to enter the TIR prism 140, so as to condense the illumination beam C1 into the TIR prism 140 and to have more uniformity for the optical path length of the illumination beam C1 in the TIR prism 140 and then propagating to the light valve 120. Certainly, the optical axis $C_{S52}$ of the incident surface S52 of the light condensing module 150B can also be inclined with respect to the third ray L3 of the illumination beam C1 to enter the incident surface S52, wherein the third ray L3 emits from the light source module 110 along the optical axis $C_{110}$ of the light source module 110, so as to condense the illumination beam C1 into the light transmitting unit 158 of the light condensing module 150B. As a result, the image beam Cm produced from the light valve 120 can more uniformly propagate from the light valve 120 to the projection lens 130 along the predetermined outgoing direction D2. In addition, since the light condensing module 150B can be treated as an integrally formed optical element, the volume of the light condensing module 150B can be reduced and the cost in need to implement the other prism can also be reduced. Thereby, the projection apparatus 100B in the embodiment can have good optical projection quality with high efficiency when configured to project the image, and the projection apparatus 100B can have the advantages of reduced volume and low cost. In addition, the material of the other elements, positioning relation, purpose of use, effect, and so on in the projection apparatus 100B in FIG. 2 are similar to those in the projection apparatus 100A in FIG. 1A, so that no further description is made here.

Figure 3:
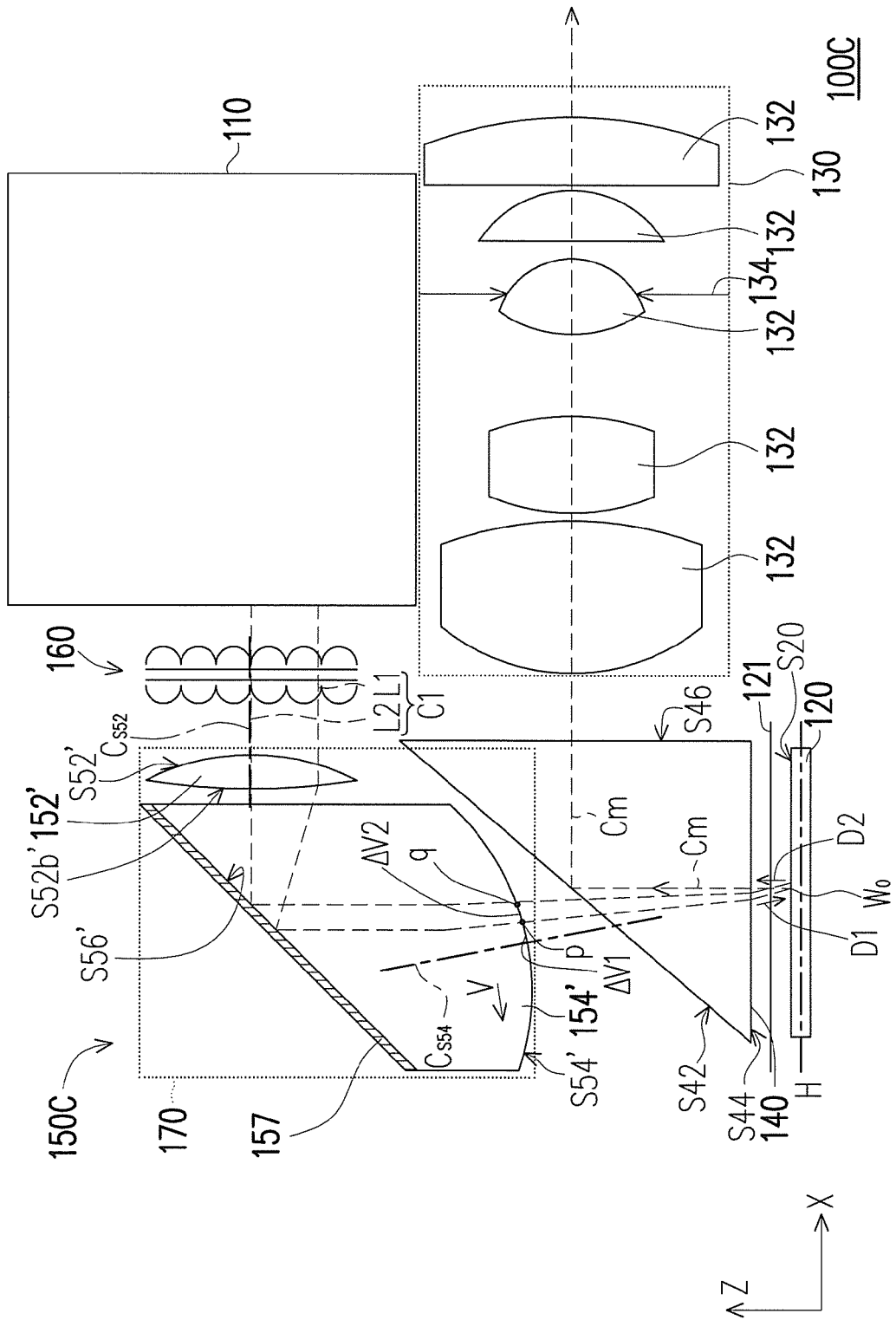
FIG. 3 is a schematic configuration of a projection apparatus, according to another embodiment of the invention.

FIG. 3 is a schematic configuration of a projection apparatus 100C, according to another embodiment of the invention. Referring to FIG. 1A and FIG. 3, the projection apparatus 100C of the embodiment is similar to the foregoing projection apparatus 100A. The difference between these two projection apparatuses is that the light condensing module 150C of the projection apparatus 100C includes a lens 152' and a light transmitting unit 154'. The lens 152' is disposed on the transmission path of the illumination beam C1, and located between the reflection surface S56' and the light source module 110, wherein a surface of the lens 152' facing the light source module 110 is the incident surface S52'. The light transmitting unit 154' is disposed on the transmission path of the illumination beam C1, and located between the lens 152' and the TIR prism 140, wherein the light transmitting unit 154' has the reflection surface S56' and the curving outgoing surface S54'. From another point of view, the light transmitting unit 154' in the light condensing module 150C can be considered as that the second lens 154 and the reflection unit 156 in FIG. 1D are integrated as an integrally formed single optical element.

In the embodiment, the optical axis $C_{S54}$ of the curving outgoing surface S54' of the light condensing module 150C is also inclined with respect to the direction of the first ray L1 of the illumination beam C1 to enter the TIR prism 140, and can condense the illumination beam C1 into the TIR prism 140, so that the optical path length of the illumination beam C1 in the TIR prism 140 and propagating to the light valve 120 can be more uniform. Certainly, the optical axis $C_{S52}$ of the incident surface S52' of the light condensing module 150C can also be inclined with respect to the direction of the third ray of the illumination beam C1 to enter the incident surface S52', wherein the third ray emits from the light source module 110 along the optical axis $C_{110}$ of the light source module 110, so as to condense the illumination beam C1 into the light transmitting unit 154' of the light condensing module 150C. As a result, the image beam Cm produced from the light valve 120 can more uniformly propagate from the light valve 120 to the projection lens 130 along the predetermined outgoing direction D2. In addition, since the lens 152' cooperates with the light transmitting unit 154', the volume of the light condensing module 150C can be reduced. In this manner, when the projection apparatus 100C is projecting image, the image with better quality projected on the screen can be obtained, and the projection apparatus 100C can have the advantages of reduced volume and low cost. Further, the material of the other elements, positioning relation, purpose of use, effect, and so on in the projection apparatus 100C in FIG. 3 are similar to those in the projection apparatus 100A in FIG. 1A, so that no further description is made here.

Figure 4:
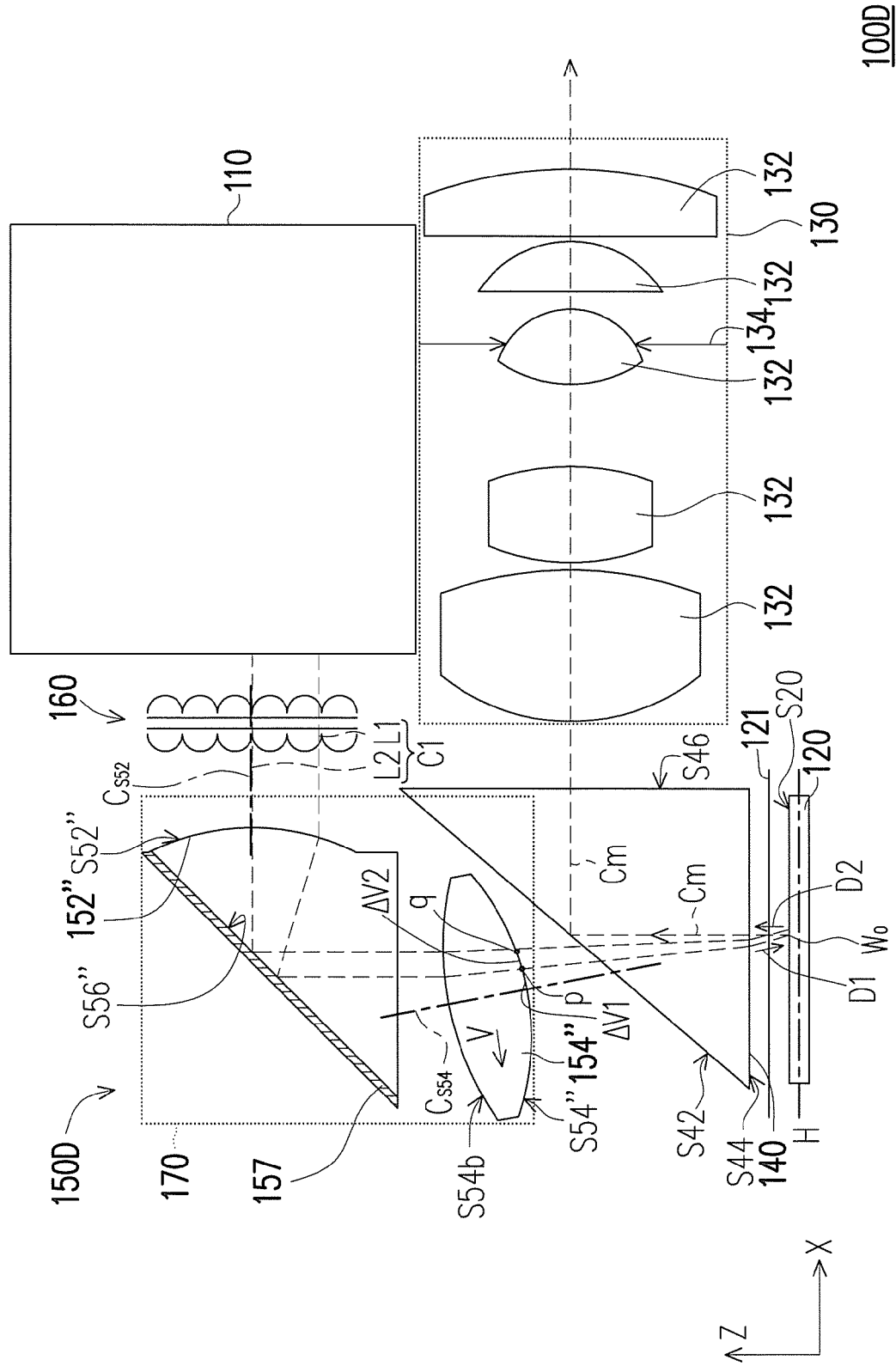
FIG. 4 is a schematic configuration of a projection apparatus, according to another embodiment of the invention.

FIG. 4 is a schematic configuration of a projection apparatus, according to another embodiment of the invention. Referring to FIG. 3 and FIG. 4, the projection apparatus 100D is similar to the foregoing projection apparatus 100C. Here, the light condensing module 150D of the projection apparatus 100D also includes a light transmitting unit 152" and a lens 154". However, the difference between the projection apparatus 100D and the projection apparatus 100C is that the light transmitting unit 152" is disposed on the transmission path of the illumination beam C1 and located between the light source module 110 and the TIR prism 140, wherein the light transmitting unit 152" has the incident surface S52" and the reflection surface S56". The lens 154" is disposed on the transmission path of the illumination beam C1 and located between the light transmitting unit 152" and the TIR prism 140, wherein a surface of the lens 154" facing the TIR prism 140 is the curving outgoing surface S54".

In the embodiment, the optical axis $C_{S54}$ of the curving outgoing surface S54' of the light condensing module 150D is also inclined with respect to the direction of the first ray L1 of the illumination beam C1 to enter the TIR prism 140, and can condense the illumination beam C1 into the TIR prism 140, so that the optical path length of the illumination beam C1 in the TIR prism 140 and propagating to the light valve 120 can be more uniform. In addition, the material of the other elements, positioning relation, purpose of use, effect, and so on in the projection apparatus 100D of FIG. 4 are similar to those in the projection apparatus 100C in FIG. 3, so that no further description is made here.

In summary, the embodiments of the invention can have at least one of the advantages or effects as follows. In the embodiments of the projection apparatus in the invention, the optical axis of the curving outgoing surface of the light condensing module is inclined with respect to the direction of the first ray of the illumination beam to enter the TIR prism, so the illumination beam after entering the TIR prism and propagating to the light valve has the optical path length in better uniformity, and the image beam produced by the light valve has better uniformity of brightness. In addition, in the light condensing module of the embodiment of the invention, because the incident ray of the illumination beam propagates along the optical axis of the curving incident surface and transmits through the curving incident surface and then emits out from the curving outgoing surface along the direction inclined with respect to the optical axis of the curving outgoing surface, the illumination beam emits out at different positions of the light condensing module can have optical path length differences. Thereby, the light condensing module can compensate the optical path length difference caused by the other optical elements, so as to reduce the total optical path length difference. In general, by the embodiments of the invention about the light condensing module, the projection apparatus in the embodiments of the invention can take simpler structure to achieve the effect of averaging optical path length, and the total volume of the projection apparatus of the embodiments of the invention can be reduced, so as to form a projection image with good quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection apparatus, comprising:
a light source module, configured to provide an illumination beam;
a light valve, disposed on a transmission path of the illumination beam to convert the illumination beam into an image beam;
a projection lens, disposed on a transmission path of the image beam, wherein the light valve has a predetermined incident direction and a predetermined outgoing direction, and when the illumination beam is incident onto the light valve at the predetermined incident direction, the image beam propagates to the projection lens from the light valve at the predetermined outgoing direction;
a total internal reflection (TIR) prism, disposed on the transmission path of the illumination beam between the light source module and the light valve, and located on the transmission path of the image beam between the light valve and the projection lens, wherein a first ray of the illumination beam emitted from the light source module, after going through the TIR prism, is incident onto the light valve at the predetermined incident direction; and
a light condensing module, having an incident surface and a curving outgoing surface, wherein the illumination beam emitted from the light source module sequentially transmits through the incident surface and the curving outgoing surface and then propagates to the TIR prism, and an optical axis of the curving outgoing surface inclines with respect to a direction of the first ray of the illumination beam to enter the TIR prism,
wherein the light valve is a digital micro-mirror device, the digital micro-mirror device comprises a plurality of micro mirrors rotating through an on-state angle to an off-state angle, wherein when any one of the micro mirrors rotates to be at the on-state angle, a normal line of the one of the micro mirrors is at a median-angle line between the predetermined incident direction and the predetermined outgoing direction.

2. The projection apparatus of claim 1, wherein an optical axis of the curving outgoing surface inclines with respect to the direction of the first ray of the illumination beam to enter the TIR prism toward a direction leaving away from a normal line of the light valve.

3. The projection apparatus of claim 1, wherein a position of the first ray to emit out from the curving outgoing surface is relatively shifted from the optical axis of the curving outgoing surface, toward a direction closing to an optical axis of the light valve.

4. The projection apparatus of claim 1, wherein the first ray enters a center of an active surface of the light valve along the predetermined incident direction, and a position of the first ray to emit out from the curving outgoing surface is relatively shifted by a first shifting distance from the optical axis of the curving outgoing surface.

5. The projection apparatus of claim 1, wherein the incident surface is a curving incident surface, a second ray of the illumination beam emitted from the light source module transmits through the curving incident surface along the optical axis of the curving incident surface, and then emits out from the curving outgoing surface along a direction inclined with respect to the optical axis of the curving outgoing surface.

6. The projection apparatus of claim 5, wherein a position of the second ray to emit out from the curving outgoing surface has a second shifting distance relatively from the optical axis of the curving outgoing surface.

7. The projection apparatus of claim 1, wherein an optical axis of the curving incident surface inclines with respect to a direction of a second ray of the illumination beam emitted from the light source module to enter the curving incident surface, wherein the second ray is emitted from the light source module along an optical axis of the light source module.

8. The projection apparatus of claim 1, wherein a position of a second ray of the illumination beam to enter the curving incident surface has a second shifting distance from the optical axis of the curving incident surface, wherein the second ray emits from the light source module along an optical axis of the light source module.

9. The projection apparatus of claim 1, wherein the light condensing module further has a reflection surface, the reflection surface is disposed on the transmission path of the illumination beam, and located between the incident surface and the curving outgoing surface, to reflect the illumination beam from the incident surface to the curving outgoing surface.

10. The projection apparatus of claim 9, wherein the light condensing module includes a reflection unit, and the reflection unit is disposed on the reflection surface.

11. The projection apparatus of claim 9, wherein the light condensing module comprises:
a first lens, disposed on the transmission path of the illumination beam, and located between the reflection surface and the light source module, wherein a surface of the first lens facing the light source module is the incident surface;
a reflection unit, having the reflection surface, wherein the reflection unit is a reflection mirror or a reflection prism; and
a second lens, disposed on the transmission path of the illumination beam, and located between the reflection surface and the TIR prism, wherein a surface of the second lens facing the TIR prism is the curving outgoing surface.

12. The projection apparatus of claim 9, wherein the light condensing module comprises a light transmitting unit, and the light transmitting unit has the incident surface, the reflection surface and the curving outgoing surface.

13. The projection apparatus of claim 9, wherein the light condensing module comprises:
a lens, disposed on the transmission path of the illumination beam, and located between the reflection surface and the light source module, wherein a surface of the lens facing the light source module is the incident surface; and
a light transmitting unit, disposed on the transmission path of the illumination beam, and located between the lens and the TIR prism, wherein the light transmitting unit has the reflection surface and the curving outgoing surface.

14. The projection apparatus of claim 9, wherein the light condensing module comprises:
a light transmitting unit, disposed on the transmission path of the illumination beam, and located between the light source module and the TIR prism, wherein the light transmitting unit has the incident surface and the reflection surface; and
a lens, disposed on the transmission path of the illumination beam, and located between the light transmitting unit and the TIR prism, wherein a surface of the lens facing the TIR prism is the curving outgoing surface.

15. A light condensing module, configured to condense and deflect an incident beam, the light condensing module comprising:
a curving incident surface, receiving the incident beam;
a curving outgoing surface, disposed on a transmission path of the incident beam from the curving incident surface, wherein the incident beam enters the light condensing module through the curving incident surface and leaves the light condensing module through the curving outgoing surface; and
a reflection surface, disposed on the transmission path of the incident beam, and located between the curving incident surface and the curving outgoing surface, wherein the reflection surface reflects the incident beam from the curving incident surface to the curving outgoing surface, wherein a first ray of the incident beam propagates through the curving incident surface along an optical axis of the curving incident surface and is reflected by the reflection surface, and then emits out from the curving outgoing surface at a direction inclined with respect to an optical axis of the curving outgoing surface,
wherein the light condensing module further comprises one selected from three conditions of:
(1) a light transmitting unit, having the curving incident surface, the reflection surface, and the curving outgoing surface;
(2) a plurality of structure members comprising:
a lens, disposed on the transmission path of the incident beam, and located between the reflection surface and the curving incident surface, wherein a surface of the lens facing away from reflection surface is the curving incident surface; and
a light transmitting unit, disposed on the transmission path of the incident beam, and located between the lens and the curving outgoing surface, wherein the light transmitting unit has the reflection surface and the curving outgoing surface; and
(3) a plurality of structure members comprising:
a light transmitting unit, disposed on the transmission path of the incident beam, and located between the curving incident surface and the curving outgoing surface, wherein the light transmitting unit has the curving incident surface and the reflection surface; and a lens, disposed on the transmission path of the incident beam, and located between the light transmitting unit and the curving outgoing surface, wherein a surface of the lens facing away from the reflection surface is the curving outgoing surface.

16. The light condensing module of claim 15, wherein a position of the first ray to emit out from the curving outgoing surface has a first shifting distance relatively from the optical axis of the curving outgoing surface.

17. The light condensing module of claim 15, wherein the optical axis of the curving incident surface is inclined with respect to a direction of a second ray of the incident beam to enter the curving incident surface, wherein the second ray enters the curving incident surface along a central axis of the incident beam.

18. The light condensing module of claim 15, wherein a position of a second ray of the incident beam to enter the curving incident surface has a second shifting distance relatively from the optical axis of the curving incident surface, wherein the second ray enters the curving incident surface along a central axis of the incident beam.

19. The light condensing module of claim 15, further comprising a reflection unit disposed on the reflection surface.

20. The light condensing module of claim 15 comprising:
a first lens, disposed on the transmission path of the incident beam, and located between the reflection surface and the curving incident surface, wherein a surface of the first lens facing away from the reflection surface is the curving incident surface;

a reflection unit, having the reflection surface, wherein the reflection unit is a reflection mirror or a reflection prism; and a second lens, disposed on the transmission path of the incident beam, and located between reflection surface and the curving outgoing surface, wherein a surface of the second lens facing away from the reflection surface is the curving outgoing surface.

21. The light condensing module of claim 15, further comprising: a supporting unit supporting the light condensing module.

* * * * *